UNITED STATES PATENT OFFICE.

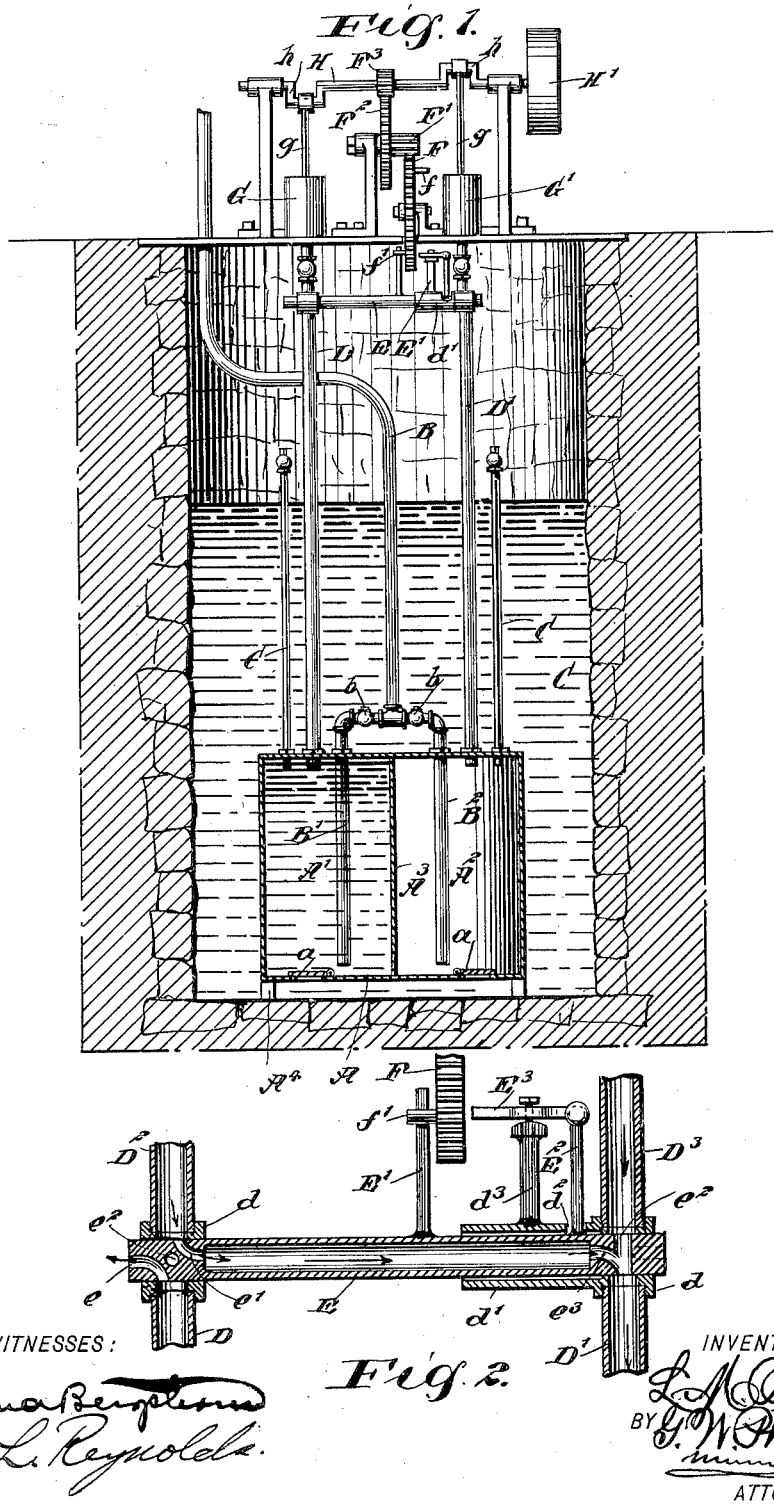

LEVI M. BROCK AND GEORGE W. PHILLIPS, OF MACKINAW, ILLINOIS.

PNEUMATIC PUMPING DEVICE.

SPECIFICATION forming part of Letters Patent No. 649,803, dated May 15, 1900.

Application filed July 20, 1899. Serial No. 724,483. (No model.)

*To all whom it may concern:*

Be it known that we, LEVI M. BROCK and GEORGE W. PHILLIPS, of Mackinaw, in the county of Tazewell and State of Illinois, have invented a new and Improved Pneumatic Pumping Device, of which the following is a full, clear, and exact description.

Our invention relates to an improvement in devices for pumping water, using compressed air as a motive force, and comprises the novel features which are hereinafter described and claimed.

Reference is to be had to the accompanying drawings, forming a part of this specification, in which similar characters of reference indicate corresponding parts in both figures.

Figure 1 is a sectional elevation of our device, showing it in place; and Fig. 2 is a section taken through the valve by which the air-supply is shifted from one pumping-cylinder to the other.

Our device is to be used in places where water is to be raised from wells, reservoirs, or ponds and it is desired to accomplish the same by the use of compressed air. Two pumping-cylinders are formed, the same being herein shown as combined within a single cylindrical body A, which is provided with a central partition $A^3$, which divides the same into two semicylindrical chambers $A'$ and $A^2$. Each of these chambers is provided with an inlet-valve $a$ in its bottom, which is closed by gravity. The cylinder containing these two pump-cylinders is supported from the bottom of the well or reservoir by means of legs $A^4$ or other suitable means, so that the water may flow beneath the same. This last feature, however, is an immaterial matter, as inlet-valves of other form may be provided in the side of the cylinder. A water-discharge pipe leads upward from each of these cylinders, said pipes being shown in Fig. 1 at $B'$ and $B^2$ and extending to near the bottom of the cylinder. These pipes after leaving the cylinders are joined to a common discharge-pipe B and are also provided with check-valves $b$, which will prevent backward flow of water.

In the upper ends of each of the cylinders $A'$ and $A^2$ is inserted an air-supply pipe, said air-supply pipes leading from the cylinders independently. These pipes D and $D'$ at their upper ends are connected with valve-casings $d$, (shown in Fig. 2,) within which is placed a valve E, by which the direction of flow of the compressed air may be controlled, so as to discharge it alternately into the cylinders $A'$ and $A^2$. The pipes D and $D'$ are continued above the valve in the sections $D^2$ and $D^3$, which connect, respectively, with the cylinders G and $G'$ of an air-pump. These air-pumps are operated by means of a shaft H, which is mounted to turn in suitable bearings and is provided with two cranks $h$, each of which has a rod $g$ connected thereto and at its lower end connecting with the piston of the pump. This shaft may be turned by means of a wheel $H'$, which is adapted to receive a belt, or by hand, as desired.

The valve E, by which the flow of air is controlled, is of a peculiar construction and is clearly shown in Fig. 2. The central portion thereof is tubular and serves as a pipe to connect the pipes $D^2$ and $D^3$, leading from the pumps, to the opposite supply-pipes $D'$ and D. The heads or ends of the valve E are mounted to turn in a suitable casing $d$, which connects the sections D and $D^2$ or $D'$ and $D^3$ of the pipes. This head has two ports $e$ and $e'$, which open at one end at opposite sides of the head and so as to communicate, respectively, with the pipes D and $D^2$. The other ends of these ports open longitudinally and connect, respectively, with the outer end of the valve and the outer air and the central tubular portion of the valve. In the position shown in Fig. 2 the port $e'$ connects the upper section $D^2$ of the pipe leading to one of the pumps with the central tubular portion of the valve, while the port $e$ connects the lower section D of the pipe or that leading to one of the water-pumping cylinders with the outer air, thus serving as an exhaust-port. In addition to these two ports a third port is provided, which is shown in section at the right-hand end of the valve, as shown in Fig. 2. This port is composed of two parts—an opening $e^2$, which extends diametrically through the valve and between the ports $e$ and $e'$, and a branch port $e^3$. In the position shown at the right-hand end of the valve in Fig. 2 this port $e^3$ forms a through connection between the upper and lower sections $D^3$ and $D'$ of the air-supply pipe. This port has a branch port $e^3$, which communicates with the central tubular portion of the valve. The corresponding ports in opposite ends of the valve are placed substantially at right angles to each other. In the position of the valve shown in Fig. 2 the air which is delivered through the pipe $D^3$ is discharged in a straight line through the port $e^2$ into the pipe $D'$ and thence into the pumping-cylinder $A^2$. The air which is supplied from the pump through the section $D^2$ of the pipes is discharged through the port $e'$, the central tubular section E of the pipe, and the port $e^3$ into the pipe-section $D'$. The air from both pump-cylinders is thus discharged into the same water forcing or pumping cylinder. Now if the valve E be turned substantially at right angles to the position shown in Fig. 2 the ports $e$ and $e'$ at the right-hand end of the valve will be thrown into the position shown by the same ports at the left-hand end and the through-port $e^2$ at the left-hand end will be brought into use, thus reversing the direction of the air and carrying the air from both pumping-cylinders into the pipe D. An automatic reversing means is provided for this purpose, consisting of the mechanism now to be described. The casing $d$ upon one side of the device is provided with a sleeve $d'$, which surrounds the valve. At one point this is provided with a slot $d^2$, adapted to accommodate an arm $E^2$, which projects radially from the valve and to permit the oscillation or partial rotation of the valve. A second arm $E'$ is also attached to the valve. These two arms are used for turning the valve. An arm $d^3$ is also secured to the sleeve $d'$ and at its outer end has a lever $E^3$ pivoted thereto, one end of said lever being in engagement with the outer end of the arm $E^2$ and the other end projecting toward the arm $E'$. Between this end of the lever $E^3$ and said arm $E'$ is placed one edge of a wheel F, said wheel being herein shown as a gear-wheel. This wheel is provided with two projections or pins $f f'$, which extend in opposite directions, so that as the wheel revolves one of the pins will engage the arm $E'$ and the other will engage the end of the lever $E^3$. This wheel is mounted to turn on suitable supports and meshes with a pinion $F'$, which is secured to one side of a wheel $F^2$, which is mounted to turn upon suitable supports and engages a pinion $F^3$, secured to the shaft H, by which the air-pumps or the air-compressor are operated. In consequence of this device the wheel F will be given a rotation much slower than that of the shaft H and will by its pins $f$ and $f'$ alternately engage the lever $E^3$ and the arm $E'$, thus throwing the tubular valve E first in one direction and then in the other. By this means the air is alternately admitted into the two pumping-cylinders $A'$ and $A^2$. The pumping-cylinders should be placed at such a level that the water will flow to them by gravity. As herein shown they are sunk at the bottom of the well or cistern from which the water is to be pumped.

To avoid overpressure in the pump-cylinders, they may be provided with a blow-off or safety valve, which is preferably mounted at the upper end of pipes C, which extend from the upper end of the pumping-cylinders to above the surface of the water, as shown in Fig. 1.

Having thus fully described our invention, we claim as new and desire to secure by Letters Patent—

1. A pneumatic pumping device, comprising two alternately-operated cylinders which are placed to receive a gravity-supply of water, separate air-supply pipes leading thereto, a double-cylinder air-pump, each cylinder being connected with one of the pipes supplying the water-pumping cylinders, a valve having a tubular central portion and its ends inserted in casings, said valves having ports adapted alternately to connect both pipes from the compressing-cylinders to one pump-supply pipe and to discharge the air from the other pump-supply pipe, and a valve-operating mechanism actuated by the compressor-actuating means, substantially as described.

2. A pneumatic water-pumping device, having two alternately-operating water-forcing cylinders, two air-compressing cylinders, a pipe leading from each compressor-cylinder to its respective water-forcing cylinder, a valve consisting of a tubular center and ends having ports therein, the two pipes each containing a casing adapted to receive one end of said valve, said valve ends having two ports opening by one end at opposite sides thereof and adapted to connect with the air-pipe, the other ends of said ports opening respectively into the central tubular part and at the outer end of the valve, said valve end also having a through-port substantially at right angles to the plane of the other ports and adapted to connect the two parts of the pipe, and a side extension from said through-port to the central tubular part of the valve, the corresponding ports of opposite ends of the valve being located substantially at right angles to each other, and automatic means for throwing said valve, substantially as described.

3. A pneumatic water-pumping device, having two alternately-operating water-forcing cylinders, two air-compressing cylinders, a pipe leading from each compressor-cylinder to its respective water-forcing cylinder, a valve consisting of a tubular center and ends having ports therein, the two pipes each containing a casing adapted to receive one end of said valve, said valve ends having two ports opening by one end at opposite sides thereof and adapted to connect with the air-pipe, the other ends of said ports opening respectively into the central tubular part and at the outer end of the valve, said valve end also having a through-port substantially at right angles to the plane of the other ports and adapted to connect the two parts of the pipe, and a side extension from said through-port to the central tubular part of the valve, the corresponding ports of opposite ends of the valve being located substantially at right angles to each other, two arms on said valve, a pivoted lever engaging one arm, a rotating wheel having projections alternately engaging said lever and the other arm to turn the valve, and means for turning said wheel from the compressor-operating mechanism, substantially as described.

4. A pneumatic water-pumping device, having two alternately-operating water-forcing cylinders, two air-compressing cylinders, a pipe leading from each compressor-cylinder to its respective water-forcing cylinder, a valve consisting of a tubular center and ends having ports therein, the two pipes each containing a casing adapted to receive one end of said valve, said valve ends having two ports opening by one end at opposite sides thereof and adapted to connect with the air-pipe, the other ends of said ports opening respectively into the central tubular part and at the outer end of the valve, said valve end also having a through-port substantially at right angles to the plane of the other ports and adapted to connect the two parts of the pipe, and a side extension from said through-port to the central tubular part of the valve, the corresponding ports of opposite ends of the valve being located substantially at right angles to each other, a sleeve supported from one of the supply-pipes and surrounding the valve-body, an arm thereon, a lever pivoted on the said arm, two turning-arms extending from the valve, the sleeve having a notch accommodating one of said turning-arms and permitting it to swing through a sufficient angle, said turning-arm being engaged by the lever pivoted upon the fixed arm, a rotating wheel having two projections adapted to alternately engage said lever and the other turning-arm to turn the valve, and means for rotating the wheel from the compressor-actuating mechanism, substantially as described.

LEVI M. BROCK.
GEORGE W. PHILLIPS.

Witnesses:
L. A. THOMPSON,
CLARENCE WILSON.